Jan. 1, 1929. 1,697,319

D. G. MACKENZIE

STEERING MECHANISM

Filed Feb. 12, 1926

INVENTOR
D. G. MacKenzie
BY E. J. Fetherstonhaugh
ATTORNEY

Patented Jan. 1, 1929.

1,697,319

UNITED STATES PATENT OFFICE.

DONALD GORDON MACKENZIE, OF MONTREAL, QUEBEC, CANADA.

STEERING MECHANISM.

Application filed February 12, 1926. Serial No. 87,918.

The invention relates to a steering mechanism, as described in the present specification and illustrated in the accompanying drawings that form part of the same.

The invention consists essentially of the novel features of construction pointed out broadly and specifically in the claim for novelty following a description containing an explanation in detail of an acceptable form of the invention.

The objects of the invention are to facilitate the handling of motor cars in view of traffic congestion and thereby enable the driver to quickly clear the vehicle from obstructions and enable other vehicles to assist in relieving the situation and continue the even flow of the traffic on city roads and highways; to simplify the construction of the gear, whereby the reach of the operating parts may be materially increased with a consequent wide turn of the wheel spindles; to accommodate the operation of the steering members to each and every change of position due to body weight or road inequalities; and thus bring the body into intimate relations in every action of the steering gear and resultant change of direction; and generally to provide an efficient and economical means for steering motor vehicles.

In the drawings, Figure 1 is a plan view of the spring axle structure and the steering gear connections thereto.

Like numerals of reference indicate corresponding parts in the various figures.

Figure 1:
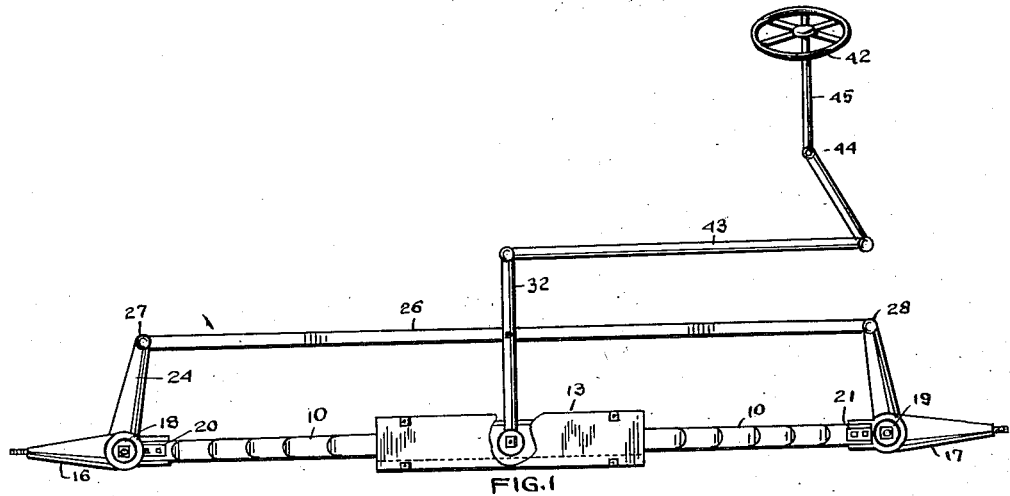
Figure 3:
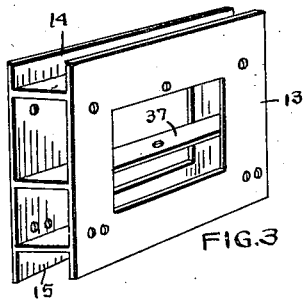
Figure 3 is a perspective detail of the central distancing bracket for the members of the spring axle structure.
Figure 4:
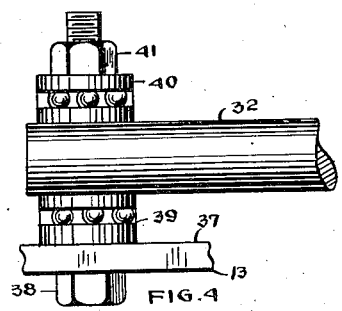
Figure 4 is an enlarged detail of the pivotal connection of the gear to the axle structure.
Figure 2:
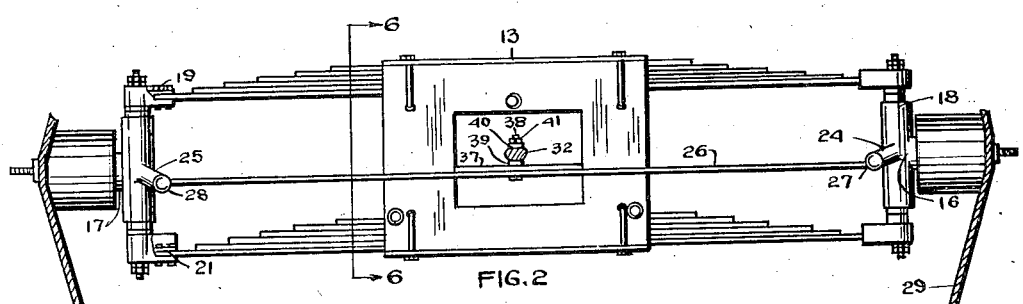
Figure 2 is an elevational view of the front axle structure, showing the steering gear connections.
Figure 6:
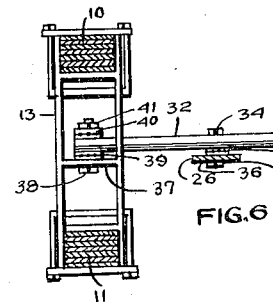
Figure 6 is a cross sectional view of the axle structure on the line 6—6 in Figure 2.
Figure 5:
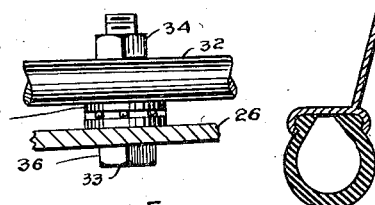
Figure 5 is a detail showing the pivotal rod connections to the gear and the axle structure.

Referring to the drawings, the leaf springs 10 and 11 are in parallel arrangement, the upper spring 10 being clamped in the distancing bracket 13 within the upper longitudinal recess 14 and the lower spring 11 being clamped in the lower recess 15 in said distancing bracket. The ends of the springs 10 and 11 are distanced by the wheel spindles 16 and 17 journalled on the king posts 18 and 19 respectively secured to the clamps 20 and 21 the said clamps 20 and 21 being rigidly secured to the ends of the springs, thus omitting any rattling parts.

The wheel spindles 16 and 17 have the axles 22 and 23 and the steering cranks 24 and 25 projecting therefrom the latter extending respectively from the spindles 16 and 17 in a rearward direction being connected by the spring bar 26, which is secured to said cranks through the universal joints 27 and 28 so that in all steering movements the cranks will be operated in perfect unison and at the same time, turn the wheels 29 and 30 in guiding the vehicle.

The steering rod 32 having the joint end 32 is secured by the pivot 33 projecting upwardly through the spring bar 26 and rod 32 and secured by the nut 34, the thrust ball bearing 35 being introduced between the head 36 of the pivot and the bar 26. The rod 32 at one end is secured to the plate 37 slightly below the vertical centre of the bracket 13 to bring said rod exactly in the centre of said bracket 13, the pivot 38 being inserted through the plate 37, the ball bearings 39, the rod 32 and the ball bearings 40 and held by the nut 41.

It will thus be seen that on the swinging of the rod 32 on its pivot 38, the bar 26 will be moved in a transverse direction so that the cranks from the wheel spindles will naturally, turn the latter and thus swing the wheels to guide the vehicle in its course of travel.

The weight of the body being on the spring axle structure naturally the steering mechanism must follow each movement of the springs, consequently when the springs are depressed by pressure from above, the bar 26 will follow each move, thereby maintaining the distance between the spindle cranks constant notwithstanding the most extraordinary actions of the springs due to the various causes that are always in evidence in the road experience of any vehicle.

The rod 32 is connected to the steering wheel 42 by any parts that will effect the operating relations and which in many cases are standard and therefore may be considered conventional, but in this invention the rod 32 is central and therefore the connecting rod 43 is transverse instead of longitudinal and pulls across on the actual steering lever, which is the rod 32. So far as the operation of the connecting rod 43 is concerned, the crank 44 from the steering column 45 is universally secured thereto and operated by the wheel 42 as usual.

It will be noticed that from the wheel 42 to the steering lever rod 32 practically the same parts are used as in the many modern motor vehicles, but it is not the same arrangement as in most steering mechanisms, where the far wheel is operated from the near wheel, thus while one wheel is turned direct from a crank lever, the opposite is turned through a rod connection, thereby adding to the difficulties of steering and the possibilities of the front wheels varying in their movements due to the direct and rod connections respectively.

The treads of the wheels 29 and 30 are directly under though slightly back from the axis of the king posts and the clamped ends of the spring axle members, this facilitates the steering of the vehicle and together with the low suspension of the body and the central steering lever rod 32 tends to automatically bring the latter back to centre after each steering movement and also to maintain it in that position, thus materially increasing the margin of safety and ease in operation of a motor vehicle.

There is no difference in this invention so far as the management of the car is concerned, with the two exceptions, namely, the flexible tie rod and spring assembly and the carrying as live load the parts of the steering mechanism, otherwise the guiding of the car is exactly the same, though the features of this gear permit a wider sweep to the wheels, do away with wheel chatter and greatly reduce necessary manual effort, and therefore insure quick and sharp turns which are of course invaluable in heavy traffic conditions.

What I claim is:—

In steering mechanism, a pair of leaf springs having post sockets rigidly secured thereto, a central spacing bracket having upper and lower channels for said springs and rigidly secured thereto and also having a shelf intermediately of the distance separating said channels and disclosed through an opening in the bracket wall, king posts secured in said sockets and spacing the springs at the ends, axle spindles journalled on said king posts and axles and steering arms projecting laterally therefrom, a flexible bar pivotally joining said arms, an operating rod pivotally secured to said flexible bar and to said shelf and a plurality of link connections to a steering column.

Signed at Montreal, Canada, this 16th day of November, 1925.

DONALD GORDON MACKENZIE.